Nov. 24, 1959 F. H. BRAY ET AL 2,914,615

ELECTRIC SIGNAL REPEATERS

Filed Sept. 21, 1953

INVENTOR
F. H. BRAY - R. G. KNIGHT
BY [signature]
ATTORNEY

United States Patent Office 2,914,615

Patented Nov. 24, 1959

2,914,615

ELECTRIC SIGNAL REPEATERS

Frederick Harry Bray and Ronald George Knight, London, England, assignors to International Standard Electric Corporation, New York, N.Y.

Application September 21, 1953, Serial No. 381,428

Claims priority, application Great Britain October 9, 1952

8 Claims. (Cl. 179—16)

The present invention relates to electrical signalling systems and to automatic telephone exchange systems.

According to the invention there is provided an electrical signalling system which comprises a signal line interconnecting a transmitting station and a receiving station, means at said transmitting station for transmitting signals over said line, a crystal triode connected to said line at said receiving station and so arranged as to be bi-stable, having an "on" state and an "off" state, and a relay under control of said crystal triode, and in which when no signal is being received the crystal triode is in its "off" (or "on") state and said relay is not (or is) operated and when a signal is received the crystal triode changes to its "on" (or "off") state and said relay is operated (or released).

According to the invention there is further provided an electrical signalling system comprising a signalling line interconnecting a transmitting station and a receiving station, means at said transmitting station for transmitting signals over said line, each said signal being a relatively positive potential or a relatively negative potential, a crystal triode at said receiving station, a resistive connection from the base of said crystal triode to a point at a third potential whose value lies between said relatively positive potential and said relatively negative potential, a connection from the emitter of said crystal triode to a point at a bias potential which is slightly negative with respect to said third potential, an electromagnetic relay connected between the collector of said crystal triode and a point whose potential is negative with respect to said bias potential, the circuit of said crystal triode and the potentials applied thereto being such that said crystal triode is bi-stable, having an "on" state in which a high current flows in the collector circuit and an "off" state in which little or no current flows in the collector circuit, and a connection from said line to the base circuit of said crystal triode, whereby the resistive termination of said line forms all or part of the base circuit resistance, and in which, when said relatively positive potential is present on said line, said triode is in its "off" state, wherein the relay in said collector circuit is not operated, and when said relatively negative potential is present on said line, said triode is in its "on" state, wherein the relay is operated, whereby said relay responds to received signals.

According to the invention there is still further provided an automatic telephone exchange system comprising a two wire speech line interconnecting a first remote point and a second remote point via a repeater station, which system comprises a balanced transmission bridge in said line at said repeater station, signal transmitting means at said first remote point adapted to apply signals to a first leg of said line, signal responsive means at said second remote point connected to the first leg of said line, signal transmitting means at said second remote point adapted to apply signals to a second leg of said line and signal responsive means at said first remote point connected to the second leg of said line, and signal repeating means at said repeating station for each said signalling direction, and in which each said signal repeating means comprises a crystal triode connected to the appropriate incoming leg and so arranged as to be bi-stable, having an "off" state and an "on" state, a relay under control of said crystal triode, and a contact controlled by said relay and adapted to apply a signal to the appropriate outgoing leg when said relay is operated, and in which when said second potential is present on said incoming leg said crystal triode is in its "off" (or "on") state and said relay is released (or operated) and when a signal is received on said leg said crystal triode is in its "on" (or "off") state and said relay is operated (or released).

The invention will now be described with reference to the accompanying drawings, in which.

Figure 1:
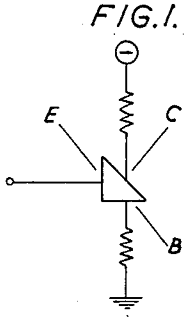
Fig. 1 is an explanatory diagram.

The circuit of Fig. 1 will first be described. It represents a crystal triode, shown as a right-angle triangle, in which the hypotenuse represents the collector, the vertical side represents the emitter and the horizontal side represents the base. These electrodes are respectively designated C, E, B in Fig. 1. When a current-gain crystal triode is used in a circuit, such as Fig. 1, it has been found to have two stable states, one being a high current state and the other a low current state, if the conditions are correct.

If the emitter is sufficiently negatively biassed with respect to the base B, then the crystal triode will remain indefinitely in the low current or "off" condition. However, if the emitter voltage is increased by applying a positive bias, the emitter-base current increases, and the collector-base current also increases. If the magnitude of the current gain (change in collector-base currents divided by change in emitter-base current), and the magnitude of the emitter-base voltage and emitter-base current are sufficient, then the emitter-base voltage will rise further. This voltage rise is a positive feedback effect, and is due to the excess of the collector-base current over the emitter-base current. This positive feedback will cause a corresponding increase in collector current, which will further increase the feedback, which will again increase collector current. Hence a cumulative action occurs until the current-gain portion of the crystal triode's characteristic has been passed. If the emitter-base potential at the input terminal is now restored to its original value the crystal triode will be maintained in its high current state, since the effective emitter-base potential is largely due to the positive feedback effect discussed above.

Thus, a positive potential triggers the crystal triode from its low current state to its high current state, and the triode continues in the high current state even after the triggering potential is removed. However, if the potential at the emitter-input terminal is reduced, so as to bring the crystal triode back into the current gain region, the collector current will also fall and the feedback will be reduced. As in the reverse case, described above, this action is cumulative, continuing until the crystal triode reaches the low curent state, which it does via the current-gain region. Hence it rapidly passes to the "off" condition as a result of a negative input potential, and remains in the off condition when that negative potential is removed.

Each time that "triggering" occurs the crystal triode is operating on a very low current gain part of its characteristic. In each case the applied pulse must be large enough to take the crystal triode into the current gain portion of its characteristic, which lies between the two portions of very low current gain. In both cases pulses of the correct polarity for triggering, but which are too small to put the emitter base voltage in the current gain portion of the characteristic, will not alter the condition at the crystal triode.

The value of the resistance in the base circuit of the crystal triode, which includes the external base resistor connected to the triode, is also of importance, since it must be within a particular range of values for any particular crystal triode. However, as the range of values which will give suitable operation vary from one type of crystal triode to another, it is necessary to determine the optimum value for the external base resistor by experimental methods.

Thus, it will be seen that if a cyclic waveform be applied to, say, the base electrode, it is possible to obtain an approximately square wave output from the collector due to the rapid transitions of the collector current. Further, by varying the standing emitter bias it is possible to vary the transit point relative to the incoming cyclic waveform. This square wave output current may have an "on, off" ratio in current values of as much as 20:1. The "on" current can then be of sufficient magnitude to permit satisfactory operation of a telephone-type relay included in the collector circuit.

Figure 2:
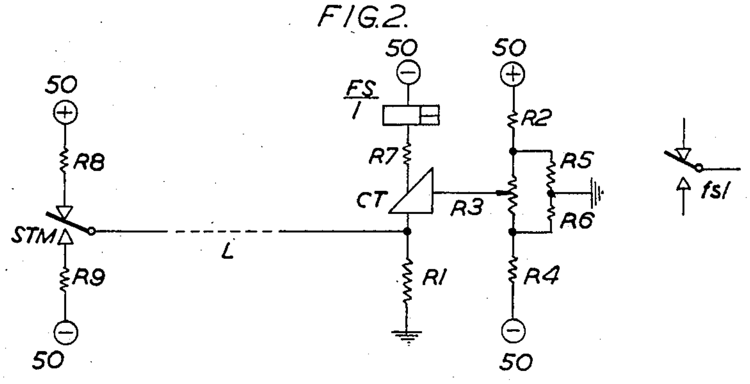
Fig. 2 is a first embodiment of the invention.

Fig. 2 shows a signalling system using double current telegraph signals. This circuit will not only respond to the signals but will introduce a measure of distortion correction. In Fig. 2 the signals are repeated to an outgoing line but they could equally be repeated to a local utilization device. The signals applied to the line at the transmitting station are either +50 volts or −50 volts, and the signal transmitting means is diagrammatically represented by a change-over contact STM.

At the receiving station the line L is connected to the base electrode of a crystal triode CT. This base electrode is also connected to earth via a resistor R1, which latter resistor forms the terminating resistor for the line L. If the terminating resistor for line L is smaller than that needed in the base circuit of CT for optimum operation, then a further resistor would be included between the connection of L to R1 and the base electrode of CT. Hence in any case the terminating resistor of the line forms the whole or a part of the external resistance connected to the base electrode of CT.

The emitter electrode of CT, represented by the vertical side of the triangle, is connected to an adjustable tap on a bleeder R2, R3, R4 between +50 volts and −50 volts. Connected across R3 are two more resistors R5 and R6 which are of equal value, and whose centre tap is earthed. R2 and R4 are also of equal value. The tap on R3 is set to a suitable value for operating satisfactorily, which value is slightly negative with respect to earth. The collector CT is connected to the negative terminal of the supply through a resistor R7 and relay FS in series.

In the condition shown, the voltage present on the base of the crystal triode CT will be a positive voltage whose value depends on the value of R1, the line resistance and on the value of R8. It will be appreciated that a positive potential applied to the base of CT is equivalent to a negative potential of the same value applied to the emitter of CT. In this condition, therefore, CT is in its low current (i.e. "off") condition and the current flowing through relay FS, if there is any, is insufficient to cause FS to operate.

When contact STM changes over, −50 volts is applied to the line L, via resistor R9 and contact STM. This causes a negative voltage to be applied to the base of CT whose value depends on the values of R9, the line resistance and R1. This, of course, has the same results as a positive voltage of the same value applied to the emitter of CT. Therefore the effect of this negative voltage on the base of CT is to trigger it to its high current (i.e. "on") state in which the current flowing through its collector circuit is sufficient to operate the relay FS. Relay FS therefore operates in response to this negative potential on L, and changes over its transmitting contacts *fs*1. The point at which this triggering of C*t* occurs depends on the potential which is applied to the emitter from R3, so there is a measure of adjustability in the distortion connection which will be effected.

When STM returns to its upper contact, a positive potential is applied to the base of CT, as described above, and this, being equivalent to a negative potential to the emitter, triggers CT back to its low current state. In this condition the current flowing in the collector circuit is insufficient to maintain FS operated, so FS releases and changes its contact *fs*1 back to its original position.

The degree of distortion correction available depends on the wave shape presented to the circuit. The steeper the wave edges the less correction is available; however, the steeper the wave edges the less correction is needed, and a larger measure is in fact available.

Figure 3:
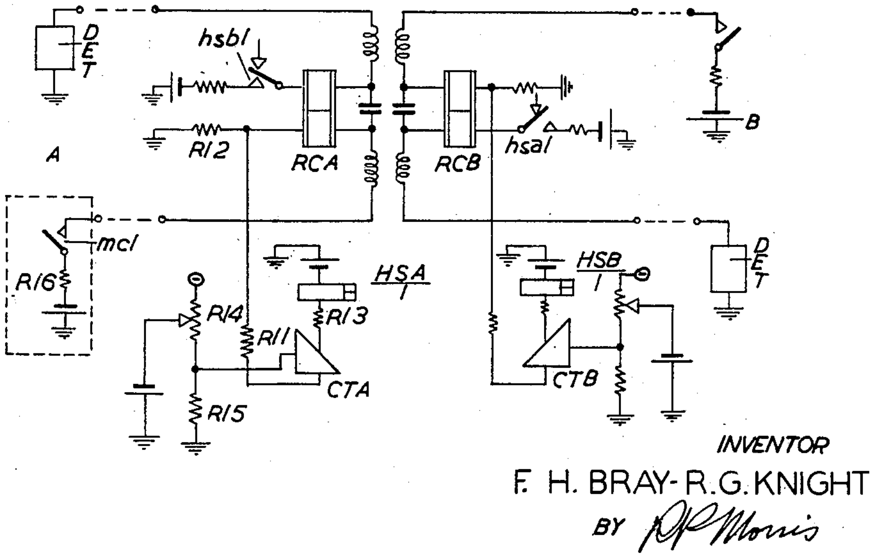
Fig. 3 is a second embodiment of the invention.

Fig. 3 shows a circuit using crystal triode repeaters in a both-way leg-signalling repeater, as is used in automatic telephone exchange systems over long lines. In this circuit the batteries shown represent the usual exchange battery.

Signals from a first remote point A are applied to the lower leg of the two speech lines as negative-going pulses by a make contact *mc*1. The broken line connection in this lower leg represents a line connecting the circuit including the balanced transmission bridge and the remote point A.

The repeater for the lower leg comprises a crystal triode CTA whose base is connected to earth via resistors R11 and R12, in series. The collector is connected to negative battery via resistor R13 and a high speed relay HSA in series. The emitter of CTA is connected to a tap on a bleeder R14, R15, between negative battery and earth. This potential is rendered adjustable since the connection to battery is via the cursor of R14. In the normal condition the potentials are such that CTA is in its low current condition, in which the current flowing in the collector circuit, if there is any, is insufficient to operate HSA.

It will be seen that the junction between R11 and R12 is connected via the lower winding of retardation coil RCA and the transformer to the lower leg of the line. Thus R12, which is part of the resistance in the base circuit of CTA, forms the termination of the line formed by the lower leg of the telephone line.

When contact *mc*1 closes, a negative potential is applied to the line via resistor R16, so that a negative voltage is applied to the base circuit of CTA. This is, of course, equivalent to a positive voltage applied to the emitter of CTA. Therefore CTA is triggered to its high current state in which the current flowing in the collector circuit is sufficient to operate HSA. Relay HSA therefore closes its contact *hsa*1 and thereby applies a negative potential to the lower leg of the line to a detector DET at the remote point B.

At the end of the impulses from A, *mc*1 opens and removes the negative potential from the lower leg of the line. Therefore the line potential returns to its previous value, which is at or near earth potential. That is, a positive-going potential is applied to the base of CTA. This is equivalent to a negative potential applied to the emitter of CTA, so that CTA is triggered back to its lower current state, in which the current in the collector circuit is unable to hold HSA operated. Therefore HSA releases and opens its contact *hsa*1. Thus the negative battery potential is removed from the lower leg of the line to the remote point B.

Signalling on the upper leg from B to A, for which the repeater comprises crystal triode CTB, high speed relay HSB and the associated circuiting, occurs in the same manner as does signalling from A to B and so is not described.

RCA and RCB are retardation coils or chokes which serve to suppress noise due to the battery supply.

It will be seen that the operation of the circuits of Fig. 2 and Fig. 3 are fundamentally identical, the only difference being that the operating point is different in the circuit of Fig. 3.

While the principles of the invention have been described above in connection with specific embodiments and particular modifications thereof, it is to be clearly understood that this description is made only by way of example and not as a limitation on the scope of the invention.

What we claim is:

1. An electrical signaling system which comprises a transmitting station, a receiving station, a signaling line interconnecting said stations, means at said transmitting station for transmitting signals over said line, a crystal triode having base, emitter and collector electrodes, said triode having two conditions of stability, an "on" state and an "off" state, a relay under control of said triode and operable when said triode is in one of its two states, said means for transmitting signals comprising means for transmitting a relatively positive and negative potential over said line to represent the no signal and signal conditions, respectively, circuit means coupling said triode to said line whereby said triode assumes its "off" and "on" states in response to the no signal and signal conditions, respectively, of said line, a third source of potential having a value lying between the values of said positive and negative potentials, respectively, a resistive connection intermediate said third source and said base electrode, a connection from said line to said base electrode, said resistive connection terminating said line and forming at least a part of the base resistance of said triode, a fourth source of bias potential having a value being slightly negative with respect to the potential of said third source, a connection intermediate said fourth source and said emitter electrode, a fifth source of potential having a value negative with respect to said fourth source, and a connection including said relay from said collector electrode to said fifth source, whereby when the no signal condition is present on said line, a low current flows between said collector and emitter electrodes and of a value insufficient to operate said relay, and when the signal condition is present on said line, a high current flows between said collector and emitter electrodes and of a value sufficient to operate said relay.

2. A signalling system, as claimed in claim 1, and in which said signalling line is directly connected to said base electrode.

3. A signalling system, as claimed in claim 1, and in which the resistive connection between said base electrode and said first source of potential includes two resistors and the signalling line is connected to the junction between said resistors.

4. An automatic telephone exchange system comprising a first remote station, a second remote station, a repeater station, a two wire speech line interconnecting said first remote station and said second remote station via said repeater station, which system comprises a balanced transmission bridge in said line at said repeater station, signal transmitting means at said first remote station adapted to apply signals to a first leg of said line, signal responsive means at said second remote station connected to the first leg of said line, signal transmitting means at said second remote station adapted to apply signals to a second leg of said line, and signal responsive means at said first remote station connected to the second leg of said line, and signal repeating means at said repeating station for each leg of said line, and in which each said signal repeating means comprises a crystal triode connected to the appropriate incoming leg and circuit means for connecting said triode for bi-stable operation, having an "off" state and an "on" state, a relay under control of said crystal triode, and a contact controlled by said relay and adapted to apply a signal to the appropriate outgoing leg when said relay is operated, and in which said crystal triode is adapted to be in its "off" state when no signal is present on said incoming leg, whereby said relay is released, and to be in its "on" state when a signal is received on said leg, whereby said relay is operated.

5. An automatic telecommunication exchange system, as claimed in claim 4, and in which the signal transmitting means includes means for normally applying a first relatively positive potential to said leg and a second relatively negative potential to said leg when a signal is transmitted.

6. An automatic telephone exchange system, as claimed in claim 5, and which further comprises a first source of potential, a resistive connection from the base of the crystal triode to said first source of potential, and a connection from a leg of the line to said resistive connection, whereby said resistive connection terminates said leg and forms at least a part of the base resistance of said crystal triode, the crystal triode being in its "off" state when no signal is being received.

7. An automatic telephone exchange system, as claimed in claim 6, and which further comprises a second source of potential the potential of which is slightly negative with respect to the potential of said first source, a connection from the emitter of the crystal triode to said second source of potential, a third source of potential, the potential of which is negative with respect to the potential of said second source, and a connection including the relay from the collector of said crystal triode to said third source of potential, the adjustment of said crystal triode being such that when said first relatively positive potential is present on the leg, said crystal triode is in the "off" state in which the collector circuit passes low current and said relay is not operated, and when said relatively negative signal potential is received on said leg, said crystal triode assumes its "on" state in which a high current flows in the collector circuit and said relay is operated.

8. An automatic telephone exchange system, as claimed in claim 7, in which the resistive connection comprises two resistors in series and the leg is connected to the junction between said two resistors.

References Cited in the file of this patent

UNITED STATES PATENTS

| | | |
|---|---|---|
| 2,498,723 | Theillaumas | Feb. 28, 1950 |
| 2,665,845 | Trent | Jan. 12, 1954 |